US006285708B1

(12) United States Patent
Shively et al.

(10) Patent No.: US 6,285,708 B1
(45) Date of Patent: Sep. 4, 2001

(54) SPREAD SPECTRUM BIT ALLOCATION ALGORITHM

(75) Inventors: Richard Robert Shively, Convent Station; Ranjan V. Sonalkar, North Caldwell, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/527,305

(22) Filed: Mar. 16, 2000

Related U.S. Application Data (60) Continuation of application No. 09/527,305, filed on Mar. 16, 2000, which is a division of application No. 09/000,842, filed on Dec. 31, 1997, now Pat. No. 6,144,696.

(51) Int. Cl.[7] ........................................... H04B 1/38
(52) U.S. Cl. ........................................... 375/222; 375/225
(58) Field of Search .................................. 375/222, 219, 375/225, 240; 370/232, 233, 234, 235, 344, 345, 358, 368; 455/522

(56) References Cited

U.S. PATENT DOCUMENTS

| | | | |
|---|---|---|---|
| 4,456,925 | 6/1984 | Skerlos et al. ........................ 358/85 |
| 4,620,289 | 10/1986 | Chauvel ............................... 364/521 |
| 4,725,694 | 2/1988 | Auer et al. ............................. 178/18 |
| 4,916,441 | 4/1990 | Gombrich ............................. 340/712 |
| 5,014,267 | 5/1991 | Tompkins et al. ..................... 370/62 |
| 5,157,717 | 10/1992 | Hitchcock ............................... 379/96 |
| 5,335,276 | 8/1994 | Thompson et al. ..................... 380/21 |
| 5,393,964 | 2/1995 | Hamilton et al. ..................... 235/381 |
| 5,406,615 | 4/1995 | Miller, II et al. ...................... 379/59 |
| 5,488,412 | 1/1996 | Majeti et al. .......................... 348/10 |
| 5,512,935 | 4/1996 | Majeti et al. ............................ 348/9 |
| 5,528,593 | * 6/1996 | English et al. ......................... 370/84 |
| 5,534,913 | 7/1996 | Majeti et al. ............................ 348/7 |
| 5,546,316 | 8/1996 | Buckley et al. ................ 364/479.03 |
| 5,561,604 | 10/1996 | Buckley et al. ................ 364/479.05 |
| 5,572,005 | 11/1996 | Hamilton et al. ..................... 235/381 |
| 5,583,965 | 12/1996 | Douma et al. ....................... 395/2.84 |
| 5,584,054 | 12/1996 | Tyneski et al. ......................... 455/89 |
| 5,587,735 | 12/1996 | Ishida et al. ........................... 348/14 |
| 5,598,435 | * 1/1997 | Williams ............................. 375/261 |
| 5,619,684 | 4/1997 | Goodwin et al. ..................... 395/500 |
| 5,644,628 | 7/1997 | Schwarzer et al. ................ 379/93.19 |
| 5,671,267 | 9/1997 | August et al. ......................... 379/61 |
| 5,682,195 | 10/1997 | Hendricks et al. ...................... 348/6 |
| 5,684,918 | 11/1997 | Abecassis .............................. 386/83 |
| 5,832,387 | * 11/1998 | Bae et al. ............................. 455/522 |
| 5,960,003 | * 9/1999 | Fischer et al. ....................... 370/468 |

* cited by examiner

*Primary Examiner*—Stephen Chin
*Assistant Examiner*—Mohammad Ghayour
(74) *Attorney, Agent, or Firm*—Banner & Witcoff, Ltd.

(57) ABSTRACT

High transmission capacity in a twisted pair signal line, where power is limited by a power spectral-density mask and an aggregate signal power constraint, is obtained by: (1) allocating data to multitone sub-bands according to a lowest marginal power-cost per bit scheme and (2) in an environment where an aggregate power budget remains after all bits have been allocated to all sub-bands with sufficient margins to carry a bit, assigning additional bits to sub-bands with otherwise insufficient power margins to carry a single bit, by frequency-domain-spreading a single bit across several sub-bands at correspondingly reduced power levels, to permit the otherwise unacceptable noise levels to be reduced on average by despreading at the receiving end. Another feature of the invention, applicable in an environment in which multiple interfering channels are employed, provides increased signal throughput by (3) transmitting coherently in a number of multitone sub-bands, identical blocks of data, with the number of multitone sub-bands being equal to a number of interfering channels and multiplying the signal carried by corresponding sub-bands in the separate interfering channels by a different respective vector from an orthonormal basis set so that near-end cross-talk is eliminated upon despreading at the receiving end.

13 Claims, 5 Drawing Sheets

SPREAD SPECTRUM BIT ALLOCATION ALGORITHM

This application is a continuation of U.S. patent application Ser. No. 09/527,305 filed Mar. 16, 2000, which is a divisional patent application of U.S. patent application Ser. No. 09/000,842 filed Dec. 31, 1997, which is now U.S. Pat. No. 6,144,696 to R. R. Shively et al.

TECHNICAL FIELD

This invention relates to discrete multitone transmission (DMT) of data by digital subscriber loop (DSL) modems and more specifically to the allocation of bits, respectively, to the discrete multitones.

BACKGROUND OF THE INVENTION

In digital communication systems employing multi-channel or multi-carrier transmissions, the most effective allocation of bits to the channels has been discussed in the literature. The well-known solution from information theory, analogized to pouring water over a terrain defined by the noise/attenuation of the channel transform characteristic, has been found to insure efficient use of signal power within limits defined by aggregate power and power spectral density mask limits. However, the method in some instances may not go as far as possible in exploiting available power imposed by these limits.

For heuristic purposes, the prior art and the invention are discussed in terms of N quadrature amplitude modulation (QAM) channels with a uniform symbol rate and a non-uniform (unique to each channel) QAM constellation, QAM, a form of combined amplitude and phase modulation, represents k-bit sets of data by modulating two (orthogonal) quadrature carriers, $\cos 2\pi f_c t$ and $\sin 2\pi f_c t$ to generate a pulse whose phase and amplitude convey the encoded k-bits of information. The QAM signal tone can be viewed as a phasor in the complex plane, each distinguishable phasor representing a unique state of the tone identified with one unique value in a range. Thus, if the channel and signal power are such that 4 separate phasors can be reliably distinguished, the scheme allows two bits to be represented. For 3 bits to be represented, 8 phasors must be distinguished and so on. The number of different phasors or states that are distinguishable in a single tone (pulse), the QAM constellation, is limited by the signal to noise ratio of the channel and limits imposed by external standards as discussed below.

In a DMT modem, a transmission frequency band is separated into N sub-bands or frequency bins, each corresponding to one QAM channel. In a non-ideal channel each sub-band has a different capacity as a result of the variation of noise and attenuation with frequency. In addition, external standards impose limits on the aggregate power of a signal (the power applied in all sub-band channels) and a cap on the power as a function of frequency defined by a power spectral density mask.

The power spectral density mask may be dictated by the standard used in a particular country implementing the standard (such as A.N.S.I. standard T1.413-1995). The mask may also be a design constraint intentionally imposed by a modem designer for some other reason. For example, a designer may intentionally impose a constraint that no more than n bits are to be transmitted on a transmit channel frequency. Similarly, the designer may impose a constraint that a minimum of bits (or no bits) must be transmitted on a particular tone or frequency. For example, the power limit for frequencies or tones between 0 and 200 kilohertz must be less than −40 dBm/Hz (a power level referenced to one milliwatt over 1 Hz bandwidth). Above 200 kHz (to frequencies in the megahertz of spectrum), the constraint may be −34 dBm/Hz.

Figure 1:
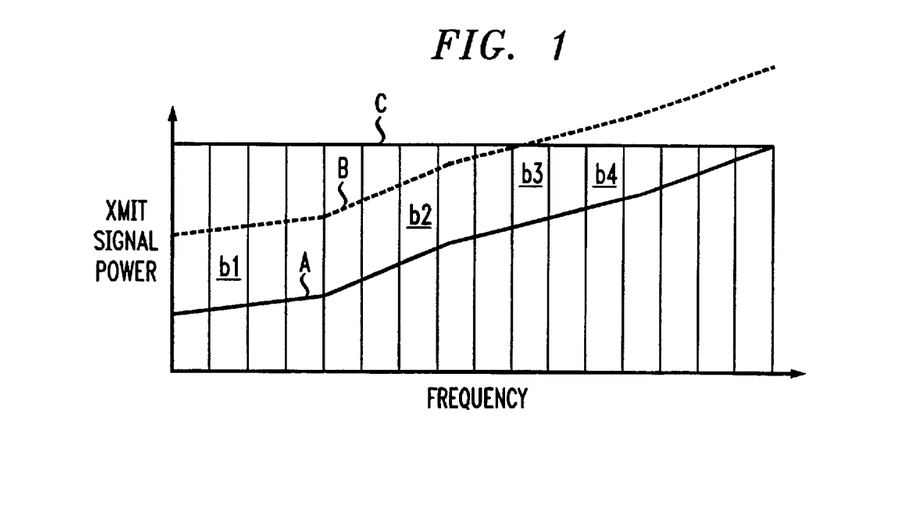
FIG. 1 shows an arbitrary transform characteristic of an arbitrary channel with multitone channels, a power spectral density mask limit, and a minimum power required to transmit a single bit, assuming a specified error and symbol rates, superimposed thereon.

Referring to FIG. 1, the attenuation+noise characteristics of a medium can be graphically represented by a floor in a power spectral graph. The lower curve, the channel transform characteristic A represents this floor, that is, the combined effect of noise and attenuation as a function of frequency. A certain margin of power is required to meet or exceed the minimum threshold of a signal for reliable data transmission. In other words, the power of a signal in a given sub-band must be sufficiently high to carry a minimal (1-bit) QAM tone to obtain a predefined bit error rate. The minimum margin, that required to transmit a single bit, is represented by curve B. Curve C represents the limits imposed by a power spectral density mask imposed by an external communications standard. The other limit is on the aggregate power, also defined by an external communication standard, e.g., ANSI Standard T1.413-1995 limits the total power for all sub-bands to 100 mWatts. Some coding techniques, such as Wei code described in American National Standard for Telecommunications—Network and Customer Installation Interfaces—Asymmetric Digital Subscriber Line Metallic Interface, ANSI T1.413-1995, may also require a minimum number of bits in a frequency band if the band is to convey any information at all. In other words, if the power spectral density mask limit may require that less energy be used than the minimum required to transmit a single bit.

Note that the minimum allowable size of the power margin is, in part, arbitrary size, to an extent, it is defined in terms of some a priori rules and technical criteria (which are arbitrary to the extent that they establish a dividing line between acceptable and unacceptable error rates; Bit Error Rate or BER) for the given communication system. Note also that the size of the margin available for a given sub-band corresponds to the dimension of the constellation that can be represented in a signal carried in that QAM channel. That is, the larger the margin in a band, the greater the number of states that can be reliably distinguished in that band and the larger the constellation that can be used.

The above context creates a bit-allocation problem. That is, given the constraints, how should bits be allocated among the available QAM channels to provide the higher possible data rates? DSL modems that use DMT modulation concentrate the transmitted information in the frequency sub-bands that have the minimum attenuation and noise. The optimum distribution of transmission power is obtained by distributing the power according to the well-known "water pouring" analogy as described in Robert G. Gallagher, Information Theory and Reliable Communication, John Wiley and Sons, New York, 1968. Such optimal distribution requires a strategy for allocating bits to the sub-bands for the idealized situation where the channel sub-bands approach zero width ($\Delta f \rightarrow 0$). For discrete bits, the applicable metaphor could be described as an ice-cute pouring analogy.

DSL technology was conceived to maximize the throughput on twisted pair copper wiring with attendant background noise, time-variant Far End Cross Talk (FEXT) and Near End Cross Talk (NEXT). To determine the transform characteristic of the channel, the modems negotiate during an initial channel signal-to-noise ratio (SNR) estimation procedure. During the procedure, the transmitter sends a known pseudo noise (PN) signal. The receiver computes the characteristics of the received signal in the form of a ratio $N_k/g_k$, where $g_k$ is the channel gain (inverse of the attenuation) in frequency band k and $N_k$ is the noise power in the band k. The literature contains many algorithms for determining the power distribution across the full frequency bandwidth for maximum data throughput. As noted above, the optimum approach for non-uniform Gaussian noise channel divided such that each band can be considered an additive white Gaussian noise channel has been proved to be the "water pouring" algorithm of power distribution. In this case, the $g_k/N_k$ Profile is compared to a terrain and the available aggregate power limit to a fixed supply of water poured over the terrain. The depth of the water corresponds to the power spectral density. The water pouring analogy is inappropriate to allocation of power in digital channels intended for transmission of binary data (bits).

According to one method of allocating bits (John A. C. Bingham, *Multicarrier Modulation for Data Transmission: An Idea Whose Time Has Come,* IEEE Communication Magazine, May 1990, pp5–14), frequency sub-bands or bins are "filled" with data bits one bit at a time. A bit is added to the bin for which the marginal power cost is the lowest. That is, a bit is added to the bin such that transmission in that bin is the least expensive, relative to an additional bit in any other bin, in terms of power needed for the resulting signal constellation to be received at a predefined BER. The filling procedure is followed unit the total Power Budget is used up. Since power can only be allocated in discrete amounts corresponding to each bit, the procedure is likened, as mentioned, to an ice-cube filling procedure rather than a water-filling procedure.

OBJECTS AND SUMMARY OF THE INVENTION

It is an object of the invention to provide a method for transmission in a multitone communication system together with an algorithm for allocating bits in the system.

It is an object of the invention to provide a method for transmission in a multitone communication system subject to an aggregate signal power constraint together with an algorithm for allocating bits in the system.

It is an object of the invention to provide a method for transmission in a multitone communication system subject to a signal-power spectral density mask constraint together with an algorithm for allocating bits in the system.

It is an object of the invention to provide a method for transmission in a multitone communication system subject to an aggregate signal power constraint and a signal-power spectral density mask constraint together with an algorithm for allocating bits in the system.

It is another object of the invention to provide a method for transmitting data over multiple interfering channels.

It is another object of the invention to provide a method for transmitting data over multiple interfering channels and a method for reducing interference between the interfering channels.

It is another object of the invention to reduce near end cross talk between DSL modems communicating over the same cable.

Briefly, high transmission capacity in a twisted pair signal line, where power is limited by a power spectral-density mask and an aggregate signal power constraint, is obtained by: (1) allocating data to multitone sub-bands according to a lowest marginal power-cost per bit scheme and (2) in an environment where an aggregate power budget remains after all bits have been allocated to all sub-bands with sufficient margins to carry at least one bit, assigning additional bits to sub-bands with otherwise insufficient power margins to carry a single bit, by frequency-domain-spreading a single bit across several sub-bands at correspondingly reduced power levels, to permit the otherwise unacceptable noise levels to be reduced on average by despreading at the receiving end. In an environment in which multiple interfering channels are employed, signal throughput is increased by (3) forming a number of sub-bands for spreading blocks of data that is equal to a number of interfering channels and multiplying the signal carried by corresponding sub-bands in the separate interfering channels by a different respective vector from an orthonormal basis set so that near-end cross-talk is eliminated upon despreading at the receiving end.

Note that "spreading" as used in the present application, refers to a process applied at a stage where the signal is decomposed into spectral elements, so that it an be applied selectively to frequency components, in contrast to conventional spreading found in, for example, wireless (cellular) telephony, where spreading is applied to the signal time series, and affects (spreads) all elements of the spectrum equally as a consequence.

According to the invention bit allocation may be performed to optimize throughput within aggregate power and power spectral density mask limits. Some method, such as the approach identified above with water pouring analogy, may be used for this bit allocation. The process of bit allocation will be limited either by the mask limit or the aggregate signal power limit. If after efficient allocation, the total signal power is less than the aggregate power limit, there will usually be unused sub-bands. These unused sub-bands were rejected in the initial bit-allocation process because the available power margin in them was insufficient to transmit a single bit. That is, the channels were identified as unusable because transmitting a single bit was found to exceed the mask limit for the channel. In this case, where the bit allocation process is limited by the mask, the channels with low power margins are used to transmit information by spreading a single block of data (one or more bits) over multiple channels and then despreading them at the receiver.

The device of spreading and despreading over multiple channels also provides a mechanism for reducing near end cross talk (NEXT). The context to which this device applies is a packet consisting of I interfering channels and nI carriers in each channel. For example, the channels could be four wire pairs, in each, some multiple of four carriers are used to convey information by spreading a single block over each of four carriers to transmit, and then despreading at the receiver. At the transmitter, however, the signals in each interfering channel are multiplied by one element of an I-dimensional orthogonal code (such as a binary code). At the receiving end, the signals are multiplied again by the respective opposite orthogonal code and then despread. The process of despreading not only reduces incoherent noise as in the embodiment discussed above, but it also substantially eliminates NEXT because the interference generated in all the frequency channels, being derived from orthogonal set, cancel each other. Thus in a channel of four twisted pairs of wires, each pair transmits a different block of data but every different block is spread over four carriers in a given wire pair. The signal transmitted over each of the four wire pairs is assigned one of four orthogonal codes. Summing each block spread over the four frequency channels causes mutual cancellation of the four induced cross-talk signals of the four wires that were multiplied by the four orthogonal codes.

Discrete Multitone (DMT) modulation serves as a framework to demonstrate the spreading process. An input data stream is segmented into small blocks of bits, and each such block is re-expressed as a complex number. For example, a constellation of 16 possible discrete complete number values can be used to convey 4 bits, since 16 different states are required to represent 4 bits. The resultant array of complex numbers is inverse-Fourier transformed to synthesize a time series, Y(t), that represents a sum of multiple distinct sinusoids. (A complex conjugate array of complex numbers is used as an input to the Inverse Fast Fourier Transform process to assure a real resultant time series.)

Each of the complex numbers used to encode data therefore plays the role of a complex spectral coefficient. That is, each defines the amplitude and phase of one of the orthogonal sinusoids included in the transmitted waveform. The number of discrete points in the constellation for each of the bands is a consequence of the measured attenuation and noise level in that frequency band, based on a bit-allocation process that need not be described here.

In both of the above schemes, the signal power in each frequency carrier is reduced in proportion to the number of carriers used. Also, in both schemes, the information relating to the number of bits per block, the frequency channels over which blocks are to be spread, etc. must be shared between the transmitter and the receiver. Regarding the latter scheme, the transmitter and receiver must also share the orthogonal codes to be used for each twisted pair, though these can be established on a permanent basis.

According an embodiment, the invention provides a transmitting modem that receives digital data from a data source and modulates separate carriers to represent the digital data. The modulated signal is applied to a channel connected to a receiving modem. The channel is subject to a power spectral density mask. The transmitting modem includes first, second, and third signal modulators, each with an input. The modem also has a signal combiner with a combined output connected to the channel and a serial-to-parallel converter connected to the data source and to each of the first, second, and third signal modulator inputs. The connection is such that the digital data from the data source is converted to multiple parallel streams applied respectively to the first, second, and third signal modulators. Each of the first, second, and third signal modulators has a respective output connected to the signal combiner such that a sum of output signals of the first, second, and third signal modulators is applied to the channel. A transfer characteristic of the channel is such that a first minimum power required to represent a specified minimum number of bits by modulating in a first frequency sub-band falls below the power spectral density mask and such a that a second minimum power required to represent a second specified minimum number of bits by modulating in each of second and third frequency sub-bands exceeds the power spectral density mask. The serial-to-parallel converter is programmed to feed a first bit of the digital data to the first signal modulator to represent the first bit by modulating in the first frequency sub-band at a first power level at least as high as the first minimum power. The serial-to-parallel converter is also programmed to feed a second bit of the digital data to the second and third modulators to represent the second bit by coherently modulating in both the second and the third frequency sub-bands at a second power level below the first power level, whereby resulting signals applied in the second and third frequency sub-bands may be combined by the receiving modem to retrieve the second bit. The first and second minimum number of bits are both equal to one in the absence of some other specified constraint.

According another embodiment, the invention provides a frequency division multiplexor transmitting data from a data source over a channel. The multiplexor has a signal modulator with an input and first, second, and third outputs, each output transmitting data in a respective one of first, second, and third frequency bands. A channel response detector connected to the channel detects a transfer characteristic of the channel, the transfer characteristic including a noise power level and an attenuation of the channel. A controller connected to the signal modulator controls an allocation of first and second blocks of data from the data source for transmission in the first, second, and third frequency bands. The controller is programmed to transmit the first block of data in the first frequency band and transmit the second block redundantly in each of the second and third frequency bands at a first power level when the channel transfer characteristic is such that a power level required to transmit the second block, at a specified bit error rate, in the second frequency band alone is a first power level. However, when the channel transfer characteristic is such that a power level required to transmit the second block, at the specified bit error rate, in the second frequency band alone at a second power level, the second power level being higher than the first power level, the controller transmits the second block in the second frequency band alone.

According still another embodiment, the invention provides a modem with a frequency-division modulator and a controller. The modulator transmits input data in separate frequency channels. The controller has a memory that stores a power spectral density (PSD) mask specifying the maximum power levels permitted for each of the frequency channels. The controller's memory also stores an aggregate power limit specifying a total permitted power for all of the signals in all of the channels. The controller is programmed to measure and store in the memory the channel transfer characteristic of a communications channel through which the input data is to be transmitted. The controller is also programmed to transmit respective unique portions of the input data in of the frequency channels based on the stored aggregate power limit, the PSD mask, when the measured transfer characteristic is a first transfer characteristic. The controller is programmed to transmit a same portion of the data in at least two of the frequency channels responsively to the stored aggregate power limit, the PSD mask, when the measured transfer characteristic is a different transfer characteristic.

According still another embodiment, the invention provides a method for use in a data modulator for allocating bits to data channel frequencies. The method includes the following steps: (1) storing mask power data representing a respective maximum power level for each of the data channel frequencies; (2) storing aggregate power data representing a total amount of signal power to be applied in all of the channel frequencies; (3) allocating bits on a per frequency basis, such that bits are successively allocated until the respective maximum power level is at least substantially reached for each of the channel frequencies and such that each of the bits is allocated to a single respective one of the channel frequencies; and (4) when the aggregate power level is not substantially reached in the step of allocating, further allocating bits to multiples of the channel frequencies for transmission at reduced power rates per channel frequency, to permit further bits to be allocated, until one of the aggregate power limit is substantially reached and the respective maximum power level is reached for each of the data channel frequencies.

According still another embodiment, the invention provides an apparatus that allocates bits for data transmission via a multiple discrete frequencies. The apparatus has tone ordering circuitry, gain scaling circuitry and an inverse discrete Fourier transform modulator. The circuitry in combination allocates initial bits to frequencies on a per frequency basis, such that the initial bits are successively allocated until a maximum power level for each frequency is at least substantially reached, each of the initial bits being unique to a given frequency. The circuitry also calculates a stored total power level for the initial bits allocated to a plurality of transmit frequencies, and if the stored total power level is not exceeded, allocate further bits to frequencies for which no initial bits are allocated, such that each of the further bits is redundantly allocated to more than one of the frequencies.

According another embodiment, the invention provides a frequency-division multiplex (FDM) transmission system for a channel having multiple subchannels, each of the subchannels being susceptible to cross-talk interference from another of the subchannels. The system comprises a transmitting modem with a programmable FDM modulator connected to modulate first and second frequency carriers, representing an input data stream, in each of first and second subchannels of the channel. Also, the system includes a receiving modem connected to the channel and a modulator programmed to modulate the first and second frequency carriers coherently to represent a first subportion of the data stream in the first and second frequency bands to form first and second signals in the first subchannel. The modulator is programmed to modulate the first and second frequency carriers coherently to represent a second subportion of the data stream in the first and second frequency bands to form third and fourth signals in the second subchannel. The receiving modem has a demodulator configured to combine coherently the first and second signals. The modulator is also programmed to form the third and fourth signals such that when the demodulator combines coherently the first and second signals, cross-talk interference in the first subchannel, caused by concurrent transmission of the third and fourth signals in the second channel, is diminished in a combined signal resulting therefrom.

According to still another embodiment, the invention provides a method for reducing near end cross talk. The method performs the following steps: (1) forming first and second signals in respective first and second tones redundantly representing first data to form a first multi-tone signal such that the first and second signals are weighted by a first vector of an orthogonal set of codes; (2) applying the first multi-tone signal to a first interfering channel; (3) forming third and fourth signals in the respective first and second tones redundantly representing second data to form a second multi-tone signal such that the third and fourth signals are weighted by a second vector of an orthogonal set of codes; (4) applying the second multi-tone signal to a second interfering channel; and (5) combining the first and second multitone signals such that a distortion in the first data caused by near end cross talk in first interfering channel is diminished.

According to still another embodiment, the invention provides a frequency-division multiplex (FDM) transmission system for transmitting an input data stream through a channel. The system has a transmitting modem with a programmable FDM modulator connected to modulate first and second frequency carriers, representing an input data stream, in the channel. The system also uses a receiving modem connected to the channel. A modulator is programmed to modulate the first and second frequency carriers coherently to represent a first subportion of the data stream in the first and second frequency bands to form first and second signals. The receiving modem has a demodulator configured to combine coherently the first and second signals to extract the first subportion such that an incoherent distortion of the first and second symbols in the first channel is, on average, reduced in the extracted first subportion.

According to still another embodiment, the invention provides a method for increasing a data rate in a communication channel subject to a power spectral density mask. The method follows these steps: (1) detecting a transfer characteristic indicating a required minimum power of a respective carrier modulated to transmit one bit in each of a plurality of multitone subchannels of the channel; (2) supplying a data stream to a modulator; (3) modulating a first set of respective carriers to represent respective unique portions of the data stream in at least a subset of those of the multitone subchannels for which, in the step of detecting indicates the minimum power falls below a power limit imposed by the power spectral density mask; (4) modulating a second set of respective carriers to represent redundantly at least one portion of the data stream in at least a subset of those of the multitone subchannels for which the step of detecting indicates the minimum power exceeds a power limit imposed by the power spectral density mask; (5) receiving the at least first and second symbols at a receiving end of the communication channel; (6) combining the at least first and second symbols received at the receiving end in such a way as to increase a signal power of the at least first and second symbols and, on average, reduce incoherent distortion of the at least first and second symbols; (7) reconstructing the same portion of the data stream at the receiving end from a combination of the at least first and second symbols, resulting from the step of combining.

According still another embodiment, the invention provides a communication system for communicating data in a channel having multiple subchannels. The system has a modulator with an output for each of the subchannels. It also employs a demodulator with an input for each of the subchannels. The modulator has an input connected to receive data from a data source. The modulator is programmed to modulate separate sets of carriers in each of the subchannels to represent respective portions of the data. The modulator is also programmed to modulate n separate frequency (resulting from a modulation of the modulator being output by the modulator) carriers coherently in each of the subchannels to represent a one of the respective portions of the data. Each of the n modulated signals, upon being received at the demodulator, includes an incoherent component resulting from attenuation and/or noise in the channel, a first coherent component resulting from near-end cross talk from the n modulated signals in the subchannels other than the each, and a second coherent component output which is the original n modulated signals output by the modulator. The modulator modulates the n separate frequency carriers such that when the demodulator demodulates the n modulated signals, upon being received at the demodulator, by linearly combining the received n modulated signals, in a signal resulting from the linearly combining, the incoherent component and the first coherent component are, on average, suppressed and the second coherent component is, on average, amplified.

According still another embodiment, the invention provides a transmitting modem receiving digital data from a data source, modulating carriers to represent the digital data, and applying a resulting modulated signal to a channel connectable to a receiving modem. The transmitting modem has first, second, and third signal modulators, each with an input. The modem also has a signal combiner with a combined output connected to the channel and a serial-to-parallel converter connected to the data source and to each of the first and second signal modulator inputs such that the digital data from the data source is converted to multiple parallel streams applied respectively to the first and second signal modulators. Each of the first and second signal modulators has a respective output connected to the signal combiner such that a sum of output signals of the first and second signal modulators is applied to the channel. The serial-to-parallel converter is programmed to feed a bit of the digital data to the first and second modulators to represent the second bit by coherently modulating in both the first and second frequency sub-bands, whereby resulting signals applied in the first and second frequency sub-bands may be coherently linearly combined by the receiving modem to retrieve the bit and such that incoherent components and coherent but at least partially orthogonal components of the resulting signals are attenuated and coherent component of a modulated signal applied by the first and second modulators is amplified.

According to still another embodiment, the invention provides a method for transmitting data through a channel subject to a power spectral density mask limit and an aggregate power constraint. According to the method, a frequency-dependent transmission characteristic of the channel is detected. First and second sub-bands of an aggregate transmission band are defined responsively to a result of the step of detecting, the aggregate power constraint, and the power spectral density mask limit. A first modulator signal is generated, the signal having a first power dynamic range permitted by the power spectral density mask limit, the first modulated signal representing the first portion of the data. A second modulated signal is generated, the second signal having a second power dynamic range permitted by the power spectral density mask limit, the second modulated signal representing the second portion of the data.

DESCRIPTION OF THE PREFERRED EMBODIMENT

Figure 2:
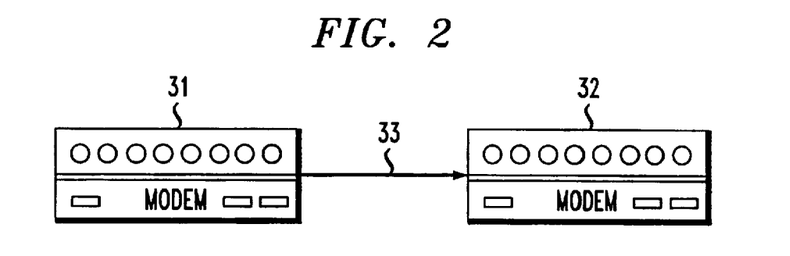
FIG. 2 shows modems in communication over one or more twisted wire pairs for purposes of describing an embodiment of the invention.

Referring to FIGS. 1 and 2, a transmitting modem 31 is connected to a receiving modem 32 by a cable 33 having four twisted pairs of conductors. In long loop system where cable 33 is of length of the order 18,000 feet or more, high signal attenuation at higher frequencies (greater than 500 kHz) is usually observed. This characteristics of cable 33 is represented graphically by curve A in FIG. 1.

For convenience of description, the details of digital modulator 14 and digital demodulator 16 are described in terms of a QAM multitone system, although the invention is applicable to other kinds of multi-carrier and multi-channel signaling as will be understood by those skilled in the art in light of the teachings disclosed herein.

Figure 3:
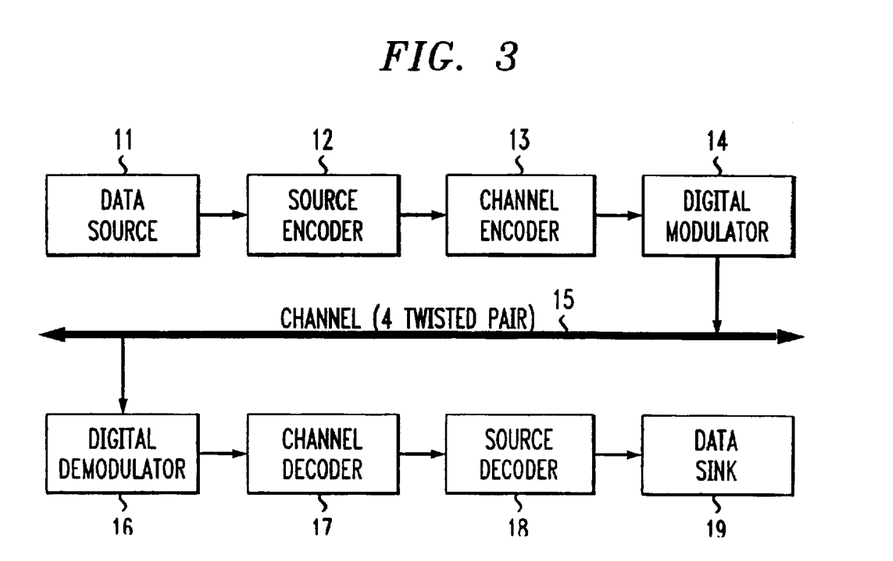
FIG. 3 shows a general diagram of elements of a communication system for purposes of describing an embodiment of the invention.

Referring now also to FIG. 3, modems 31 and 32 contain a source encoder 11, a channel decoder 12, a digital modulator 14, to take in and transmit data from a data source 11. Modems 31 and 32 also contain a digital demodulator 16, a channel decoder 17, and a source decoder 18 to receive the data and supply it to a data sink 19.

As will be recognized by those skilled in the art, source encoder 12 compresses data from data source 11 and applies the result to channel decoder 13 which error correction/detection data and applies the result to digital modulator 14. Digital modulator acts as the interface with the communication channel by modulating the data to generate a signal that can be applied to the communication channel 15. Digital demodulator 16 constructs a data stream from the modulated signal and applies it to channel decoder 17. Channel decoder 17 corrects errors in the data stream and applies the corrected data to source decoder 18 which decompresses the data and outputs the decompressed data to data sink 19.

Figure 4:
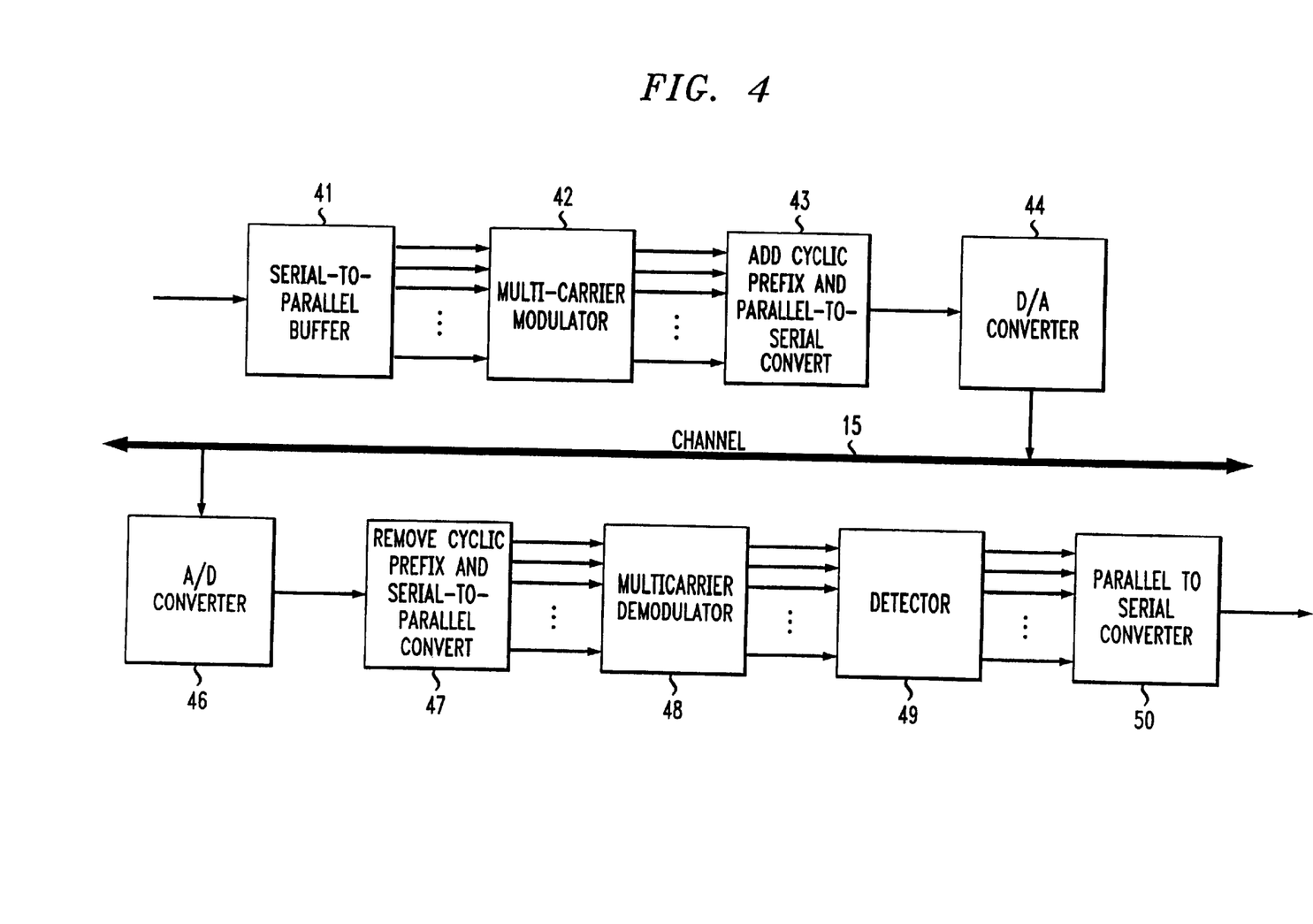
FIG. 4 shows a digital modulator and demodulator connected by a communication channel for a multitone QAM system for purposes of describing an embodiment of the invention.

Referring to FIG. 4, in a QAM multitone modulation, the spectrum is broken into multiple sub-bands or QAM channels. Digital modulator 14 generates N QAM signal tones, one for each QAM channel. Each $i^{th}$ QAM channel carriers $k_i$ bits of data. A serial-to-parallel buffer 41 segments a serial stream of digital data into N frames, each having allocated to it $k_i$ bits of data. These are applied to respective inputs of a multi-carrier modulator 42 which generates a QAM tone for each channel. Multi-carrier modulator generates N QAM tones, one for each channel, at the same symbol rate but with a respective constellation for each channel. That is, the $i^{th}$ QAM channel carries an $2^{k_i}$-ary QAM tone, a tone with $2^{k_i}$ signal points. Multi-carrier modulator modulates N subcarriers by corresponding symbols to generate the N QAM signal tones using an inverse signal Fourier transform. The allocation of bits in serial-to-parallel buffer 41 is discussed in detail below.

A parallel-to-serial converter 43 adds a cyclic prefix (one known method of preventing intersymbol interference) and sums the separate modulated data and passes the resulting data stream through an D/A converter 44 yielding a single analog signal stream. After the analog signal reaches receiving modem 32, the opposite operation occurs in A/D converter 46, serial-to-parallel converter 47, and multicarrier demodulator 48 and detector 49. Multicarrier demodulator 48 strips the modulating signal from the carrier, that is, it converts the QAM tone data into data representing the original modulating symbols. Detector 49 maps the resulting symbols into a set of bits either by quantizing or soft-decision quantization. These symbols are then queued up in a serial data stream by parallel to serial converter 50.

Referring again to FIG. 1, the allocation of bits in serial-to-parallel buffer 41 is performed according to an algorithm which is now described. In FIG. 1, the channel transform characteristic (an attenuation/noise floor) A, in the range of sub-band b1, is such that at least one bit can be represented by a QAM-encoded tone signal transmitted in that sub-band.

The same is true for sub-band b2. However, the amount of power available in sub-bands b3 and b4 are such that a QAM tone generated within the power ceiling overlying those bands would not meet the BER and symbol rate required (the minimum power to represent 1 bit being represented by curve C).

If, in the process of assigning bits to the available frequency sub-bands or "bins", the total aggregate power limit is not exceeded, then there may be otherwise "wasted" power available due to the inability to put signals in frequency sub-bands for which the spectral density mask is too close to the attenuation/noise floor A for a single bit to be transmitted but for which there is still available "room" for signal power. Such noisy and/or highly attenuated sub-bands can occur for example in long-run twisted pair conductors. Unutilized but otherwise available power could be put in the frequency sub-bands such as b3 and b4 for which the noise-floor (curve A) is too high to permit a single bit to be properly represented. According to the invention, digital modulator 14 replicates ("spreads") a k-bit symbol over multiple adjacent bands with correspondingly less energy in each band. At the receiving end, detector 49 coherently recombines ("despreads") the redundant symbols in the noisy/attenuated sub-bands. In recombining the symbols, the symbols are simply arithmetically added. Because the noise is incoherent while the signal is coherent, the noise tends to be averaged out while the signal is reinforced by the addition process.

In view of the above process of spreading and despreading certain channels according to the allocation scheme defined above, detector 49 is capable not only of detecting signal transmitted conventionally in one frequency bin, but, also of selectively summing the blocks previously spread and transmitted over the noisy/attenuated sub-bands. Of course, this is done under programmable control so that, depending on the results of the initial channel SNR estimation procedure, command signals are sent to both the transmitting and receiving modems to appropriately perform the spreading and despreading processes.

In a practical implementation of the bin-filling procedure described by Bingham (see Background section), additional constraints such as minimum and maximum number of bits per bin, a power spectrum mask, and a desired set of bit rates may also be considered. Within these constraints and those of the power spectral density mask and the aggregate power limit discussed above, the bin-filling procedure would be followed until the process is halted by any of these limits. Then a second process of allocation is performed to assign bits to frequency channels that are unallocated due to their not having sufficient power-per-channel to transmit the minimum number of bits. The second procedure determines if these channels can be used within the constraints imposed by the other limits. Thus, a first step applies a first algorithm to allocate bits to each channel within the constraints of aggregate power, maximum power per channel (PSD mask), and the maximum and minimum number of bits per channel. Note that any algorithm that allocates one constellation to each frequency bin would constitute an appropriate first step. A second algorithm is applied to allocate identical blocks of data to multiple channels through spreading as discussed above. The second algorithm would allocate bits to channels if sufficient power margin is available in multiple channels in the aggregate to transmit an additional minimum-sized block of data without exceeding the aggregate power limit. However, it may turn out that transmission of some blocks through spreading is cheaper in terms of power use than transmitting those as allocated during the first allocation procedure. In that case, an approach that employed spread and unspread signaling in an approach that allocated each bit to the channel or channels associated with the least marginal power consumption would be an alternative approach that might lead to more channels being used for spreading than for the two-step approach discussed in detail below. Generally, the most efficient utilization of a channel is to allocate data to channels with the highest SNR, which is the whole idea behind the water-pouring analogy, so the latter approach is not preferred. However, there may be channels with certain kinds of transform characteristics for which such an approach would produce improved performance.

Figure 5:
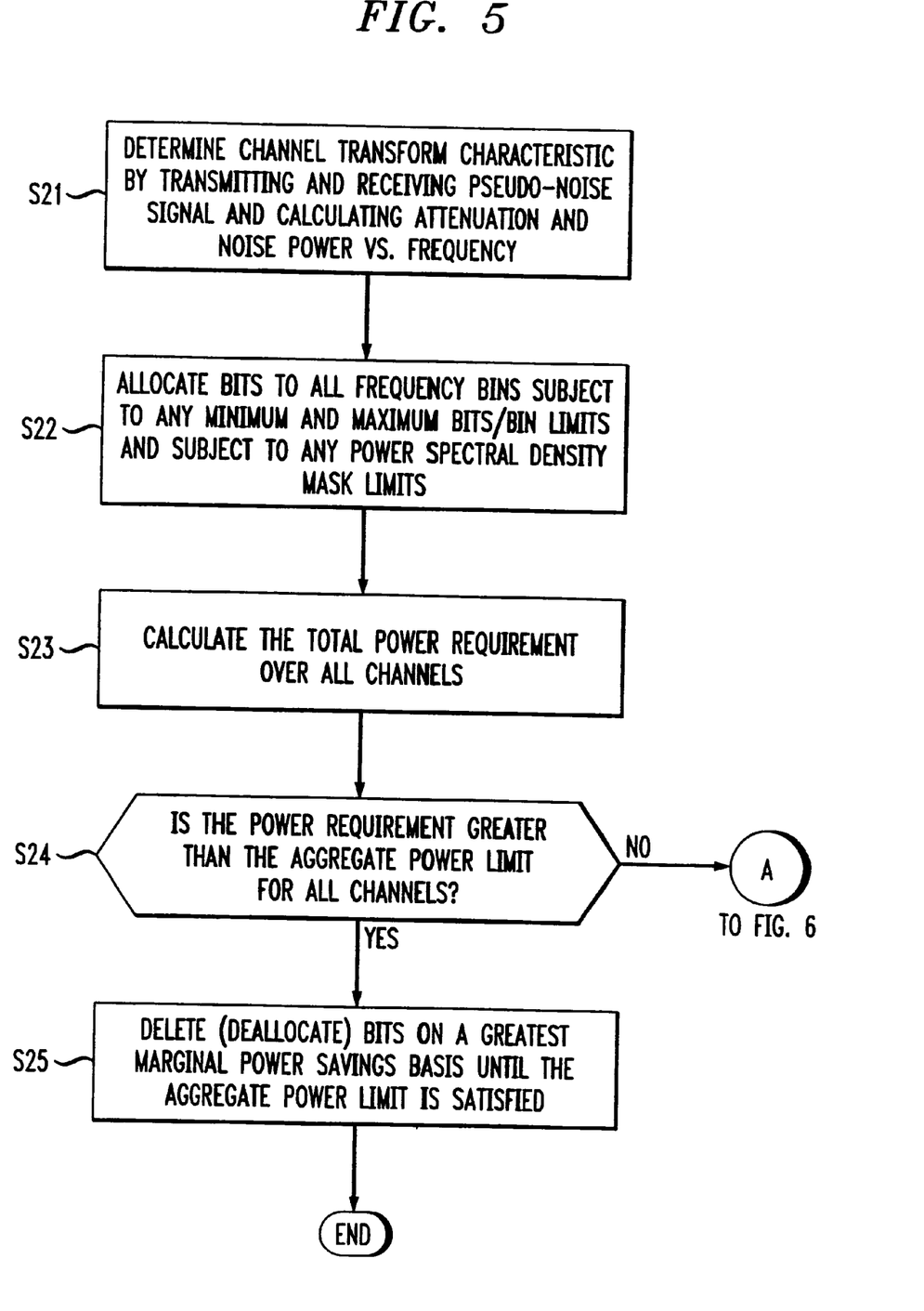
FIGS. 5 & 6 show a flow diagram for purposes of describing a control method and apparatus controlling the embodiment of FIG. 4.

Referring to FIG. 5, a practical bit-allocating algorithm is proposed in a U.S. patent application Ser. No. 08/997,167, filed Dec. 23, 1997, entitled Method and Apparatus for Allocating Data for Transmission Via Discrete Multiple Tones-, and invented by Sonalkar, et. al., and now U.S Pat. No. 6,134,274 issued Oct. 17, 2000. According to this procedure, bit allocation is performed with consideration to all practical constraints discussed above. In the method described in the above reference, the entirety of which is incorporated herein by reference, bits are allocated according to the requirements of an aggregate power constraint, a power-spectral density mask limit, and minimum and maximum bits per symbol (e.g., QAM tone).

According to an invention described by Sonalkar, et. al. in the application identified above, the following constraints are considered first: the maximum number of bits allowed in each tone or frequency bin for transmission and the maximum power to be transmitted in each bin (the power-spectral-density mask). Then, the aggregate power constraint (power budget) is applied in a second process. During the second step, if necessary, bits are removed according to a bit removal procedure that removes the bit from the channel, the removal of which results in the greatest decrease in aggregate power required. With this process, the fewest bits are removed because the bit that produces the highest marginal gain in power savings is selected for removal (deallocation).

In the first procedure, the maximum number of bits per bin is calculated first with consideration only to the power mask constraint and any minimum and maximum bits per bin (channel) constraints. First, in step S21, the channel's transform characteristic is calculated during an initialization period. Then, in step S22, the maximum number of bits that can be allocated to each bin is calculated. This computation is done from a relationship between the number of bits ($b_k$) to be transmitted in a bin and the power needed to transmit that many bits ($b_k$) in bin number k. For purposes of this calculation, the PSD mask-limited value for bin k serves as the power available for transmission in the channel corresponding to bin k.

At step S23, the total power requirement over all channels is calculated over all the transmit frequency bins. Then in step S24, the total power requirement is compared to the aggregate power limit. From the standpoint of the aggregate power limit, for example 100 milliwatts total maximum power, the bins may be considered to be overflowing at this point. If the total maximum power is not exceeded, then, the first procedure is completed and a second procedure where the spreading techniques apply, is implemented (See FIG. 5). On the other hand, if the total power limit is exceeded, then the first procedure continues with a bit removal process, in step S25 as follows.

The bit removal process is implemented to reduce the bit allocation so that the total power required for transmission meets the aggregate power limit. According to a preferred bit removal process, bits are removed sequentially, each bit being selected in turn as the bit, the removal of which, produces the greatest marginal gain in terms of recovered power. The first bit removed then is the bit that cost the most power to transmit. After the bit is deallocated, the corresponding power saved is subtracted from the total power. If the total power constraint is still exceeded after removal of the bit, the next most power-consuming bit is removed. This process is followed iteratively until the power constraint is no longer exceeded. Once the aggregate power limit is met, the first procedure is completed and no second procedure follows.

Referring now also to FIG. 5, in preparation for the second procedure, the first procedure sketched above is performed and it is confirmed that residual power remains. That is, that the difference between the aggregate power limit and the sum of the signal power over all frequencies subject to the other limits (minimum and maximum bits per channel and PSD mask limit) is greater than zero. Note that if the first procedure of FIG. 4 gets to the second phase of step S25, there will be no residual power and the procedure of FIG. 5 will not be performed.

The decibel sum of attenuation plus noise power, plotted as a function of frequency, may be perceived as a "terrain" on which the communication channel operates. A classic algorithm called "water filling" refers to continually budgeting signal power, which is the constrained resource, at the low points of this terrain first to achieve the optimum efficiency in terms of information per unit of power. One approach to multi-band assignment, therefore, is to continue this process by selecting he next four bands from a list of bands sorted with respect to the attenuation-plus-noise parameter or the power required to transmit a block of data. While this guarantees the most efficient use of the remaining spectrum under the set of constraints described above, such a procedure does not in general yield 4-tuples that are adjacent in frequency. This procedure is adopted in the process described next.

The second procedure begins at step S2. An index is set to 1 and a number of bins for spreading (the number of channels over which each block will be spread). This can be done as part of an optimization procedure or selected a priori. To limit the administrative and communication overhead associated with initialization and bit assignment (as well as the computational complexity to explore combinatorics of a large number of options), there is strong motivation to limit the number of grouping options to a single option. That is, either bits are assigned to individual bands as in the prior art, or where spreading is applied, a single sized m-tuple of frequency bands is allowed. (Choosing a larger value of m consumes frequency bandwidth more rapidly, choosing a smaller value limits the SNR deficit that can be overcome.) Empirical studies of actual telephone loop propagation characteristics indicates the payoff is greatest for making the number of bins, m, equal to 4 under this set of conditions.

Next, at step S3, an array is calculated containing the power required to transmit one bit for all bins that were not allocated in the procedure of FIG. 5. The array indicates the bin by a frequency pointer (a label), the number of bits already assigned to that bin, and the power requirement to add another bit to that bin. Now, the power required to transmit $b_k$ bits is given by:

$$E_k = (2^{b_k} - 1) \cdot \left( \frac{KN_k}{3g_k G_c} \right), \quad (1)$$

where:

$b_k$ is the number of bits carried in frequency bin k, $E_k$ is the power required in bin k to transmit the $b_k$ bits, $g_k/N_k$ is the measured gain to noise ratio in bin k, and $G_c$ is the coding gain. K is given by:

$$K = \left[ Q^{-1}\left( \frac{P_e}{N_e} \right) \right]^2, \quad (2)$$

where $P_e$ is the error probability given by:

$$P_e = 4\left(1 - \frac{1}{\sqrt{2^{n_i}}}\right) Q\left[ a\sqrt{\frac{2}{N_0}} \right], \quad (3)$$

the Q function is the partial integral of the normal distribution function given by:

$$Q(x) = \int_x^\infty \frac{1}{\sqrt{2\pi}} \cdot e^{-\frac{u^2}{2}} \cdot du, \quad (4)$$

$N_e$ is a number that assumes a value in the range of 2 to 4, in the preferred embodiment of the invention, $N_e$ is equal to 3. Since the second procedure for allocating bits to the impaired channels (the channels for which the SNR ratio does not permit a bit to be transmitted without hitting the PSD mask limit) allocates one bit at a time, $b_k$ can be set to 1 and equation (1) thus reduces to (also dividing by 4 to account for the spreading):

$$E_k = \left[ \frac{1}{4} \right] \cdot \frac{KN_k}{3g_k G_c} \quad (5)$$

Thus in calculating the power bin array, the number of bits already allocated to each of the bins is taken into account in calculating the power requirement. So the power requirement calculation is a marginal power required to add another bit to the bin. In calculating the amount of power required, if the calculated power would exceed the PSD mask limit for that bin, a very large number is used for the energy requirement so that when the array is sorted in order of increasing power, these bins with low PSD limits end up at the bottom of the sorted list.

In step S4, the power bin array is sorted in ascending order of power requirement so that the element with an index of one corresponds to the bin with the lowest energy requirement. Once the array is sorted, the array is repopulated with the bins with power requirements below the large number (used to put bins for which an additional bit would exceed the PSD mask limit) and a bins-remaining-counter, indicating the number of bins to which a bit can still be assigned, is decremented to reflect the current number of bins now available.

In step S7, the bins-remaining counter is checked to see if m−1 remain. If insufficient bins remain to spread a bit, the procedure terminates.

In step S5, the residual power (difference between aggregate power requirement and the power required to transmit all assigned bits) is calculated from all assigned bins using equation (1). Next, in step 9, the total power to transmit one bit in the adjacent m bins is calculated. Note that the m adjacent bins are adjacent in terms of the index value corresponding to the power sorting done in step S4, not the arrangement in terms of frequency.

After step S9, control proceeds to step S10 where, if the total power required to transmit one bit spread across the m bins exceeds the residual power, the program terminates, otherwise control proceeds to step S12. At step S12, a bit is allocated to each of the m bins.

Figure 6:
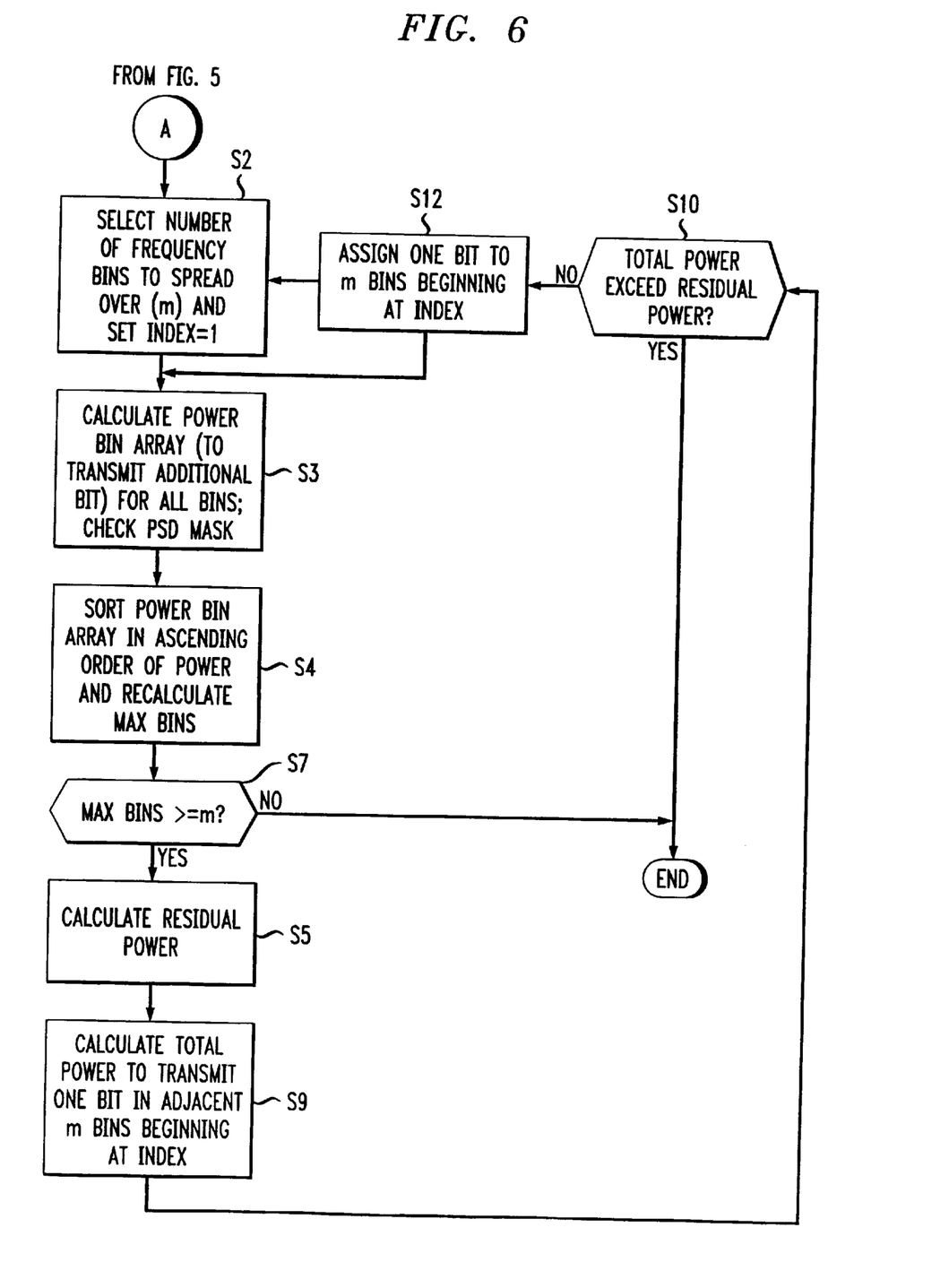

Once the procedure of FIG. 6 terminates, the array indicates the number of bits to transmit in each bin. Note that the procedure can, in principle, assign "spread bits" to bins that carry one or more entire bits by themselves.

Figure 7:
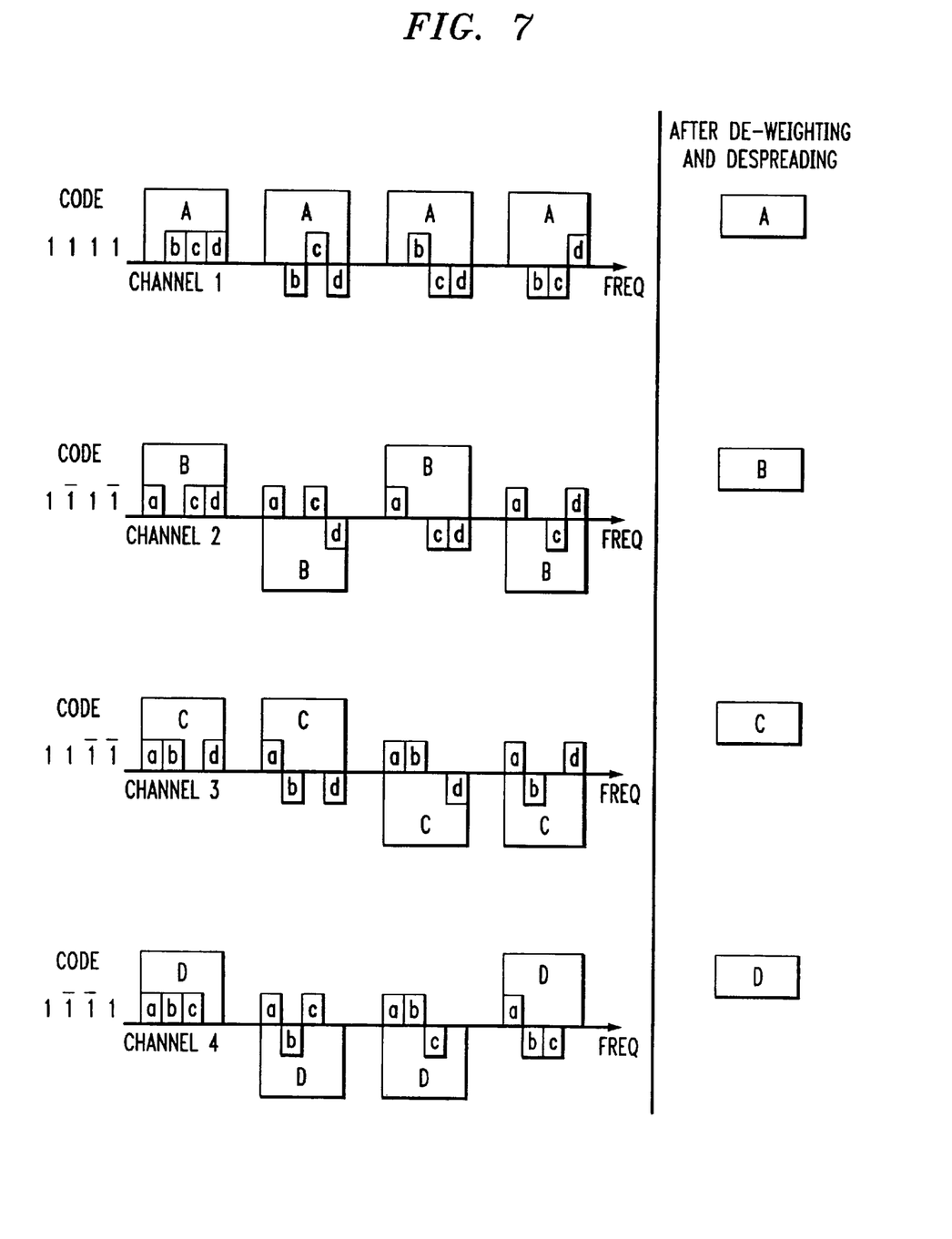
FIG. 7 shows a conceptual rendering of how signals in separate channels may interfere and how the resulting distortion may be canceled according to an embodiment of the invention.

Referring to FIG. 7, a system for a channel employing four twisted pairs will be described. Each pair of wires is an independent interfering channel. That is, a signal in one channel generates a corresponding signal in the other channels. In the four twisted pair system described here and shown in FIG. 7, a single block of data is spread across the same number of channels, in this case four. Four data blocks, possibly represented by, for example, a single QAM tone, are labeled A, B, C, and D. Each block is redundantly transmitted at four separate frequencies. However, instead of applying the signal tone directly to the channel, the transmitter weights the signals by respective elements of orthogonal, 4-element Walsh codes. The receiver de-weights the received signal at the receiving end and then despreads (sums) the de-weighted blocks to obtain the signal. The result of this is that the induced signal caused by interference is canceled out because the process of weighting each original signal by one code and de-weighting the induced signal in an adjacent channel by a different code, orthogonal to the first, causes the sums to cancel out. For example, signal B is weighted by a first code. The signal induced by signal B in adjacent channels, represented in FIG. 7 by the lower case letters, in this case "b", is also weighted by the first code. But when the signal in an adjacent channel, say channel 3 carrying signal C, arrives at the receiver, the signal C combined with an induced portion of B weighted by the first code is then deweighted by a second code. Thus, when signal C is despread (summed), the induced signal in each frequency channel cancels an induced signal in another frequency channel.

To use the invention for eliminating interference from other channels, it is not necessary to allocate bits to channels as described with reference to FIGS. 5 and 6. In fact, all data could be spread across multiple frequency channels.

Note that in a channel where signal spreading is to be used for reducing interference, one that includes multiple interfering sub-channels, it is desirable for communications to be set up with cognizance of how spreading is to be done on each of the sub-channels. That is, for example, the frequency bins in each twisted pair in a four-twisted pair bundle should all have the same bit assignments so that the interference will be canceled out as described above.

As a first level concept, the present invention relates to replicating (i.e. spreading) the spectral contents of a signal over multiple distinct parts of the physical frequency band to compensate for high attenuation and/or high noise in those parts of the communication channel frequency band that would otherwise not be usable due to noise and attenuation effects. Of course, if signal power could be increase arbitrarily, no portion of the spectrum would be unusable, however, practical considerations and standards, as discussed above, dictate otherwise. The effect of the replication is that signal-processing techniques can be used in the Receiver to recover information sent in the impaired parts of the frequency band, and, with the correct choice of parameters (i.e. degree of replication), the same level of performance (specifically bit error rate) as achieved in the unimpaired parts of the band can be achieved in portions of the band where attenuation and/or noise are high.

The consequence of this technique is a communication signal where the frequency-domain spreading (replication) is used selectively, such that not all spectral content has the same degree of redundancy, some having no redundancy as appropriate. This might be termed a hybrid modulation because of the mixed-mode, or non-uniform replication. The advantage clearly lies in the fact that spectrum is used efficiently with non-redundant transmission for those parts of the band where adequate signal-to-noise can be achieved, while spreading is applied to those parts of the band where transmission would otherwise be impossible. The added bandwidth incrementally consumed by spreading is therefore not wasteful since it exploits portions of the band that are otherwise unusable.

As mentioned the bit allocation process is not limited by the aggregate power constraint that applies, but by the second limit on the power in each band, the power spectral density mask. This occurs may occur in long lines and/or noisy environments. The mask prevents assigning any further bits to unoccupied bands because the attenuation and noise would require too much power in any of the remaining bands.

The proposed concept is to overcome the circumstance outlined above by repeating the same X, value in multiple positions in the input array to the IFFT. In this way, signals which individually do not have adequate signal/noise ratio to achieve the desired bit error rate are simply summed at the receiver to achieve the requisite SNR. As an example, summing two copies of the same QAM vector, each contaminated with the same level of noise power but with the respective noise uncorrelated, results in 6 dB signal enhancement versus 3 dB. noise growth, for a net improvement of 3 dB. In general the net enhancement is increased 3 dB. each time the number of frequency bands is doubled.

A further constraint on the allocation process described above would be to limit the 4-tuples selected to be adjacent in frequency, that is, the 4-tuples ( . . . in this example, m-tuples in general) would form a sequential series of frequency bands. This would require starting at bands with indices that are integral multiples of 4. These constraints, while compromising ideal allocation objectives, would tremendously increase the likelihood that neighboring interfering channels would have 4-tuples assigned to the same set of frequency bands. If neighboring channels are synchronized, and have replicated vectors weighted by orthogonal, 4-element Walsh codes, the result is that the mutual interference among this group of 4 wire pairs can be zero in any of the 4-band spread channels. Because the services provided by such modems is expected to be ultimately interference-limited if the service becomes popular and widespread, this capability to avoid/mitigate mutual interference among cooperating neighbors is significant. Even without orthogonality, the spreading provides a significant signal processing gain with respect to uncorrelated interference. The orthogonality feature adds a further enhancement.

Although according to the embodiments described above, power is distributed equally to the bins across which a single block is transmitted, it is clear from the description that other possibilities exist. For example, the m bins could be assigned power on a pro rata basis according to the noise-power/gain ratio corresponding to each bin. Thus, the bin corresponding to the lowest noise-power/gain ratio could carry the greatest share of the power. Bins could also be allocated different power levels according to the power margin available below the PSD mask limit.

Also, although according to the embodiment described above, a number of bins for spreading is established before allocation of data to the bins, it is possible in view of the teachings of the present specification, to spread different blocks of data over different numbers of bins. For example, one block consisting of one bit could be spread over 2 blocks and second bit, perhaps in a more impaired (by noise and/or attenuation) portion of the spectrum, spread over a larger number of bins. This could be done iteratively and the number of bins increased until all available spectrum were fully exploited (within the external and practical constraints).

Also, although according to the above embodiments, spreading is only done when the noise-attenuation floor makes transmission of a single bit impossible for any channels remaining, other possibilities exist in view of the teachings of the present specification. For example, spreading can be done in certain frequency channels which otherwise might possibly be used to carry a single bit on their own.

The following applications, filed concurrently herewith, are hereby incorporated by reference:

1. A Hybrid Fiber Twisted-pair Local Loop Network Service Architecture, U.S. patent application Ser. No. 09/001,360, filed Dec. 31, 1997;
2. Dynamic Bandwidth Allocation for use in the Hybrid Fiber Twisted-pair Local Loop Network Service Architecture, U.S. patent application Ser. No. 09.001,425, filed Dec. 31, 1997;
3. The VideoPhone, U.S. patent application Ser. No. 09/001,905, filed Dec. 31, 1997;
4. VideoPhone Privacy Activator (Gerszberg 44-10-3);
5. VideoPhone Form Factor, U.S. patent application Ser. No. 09/001,583, filed Dec. 31, 1997;
6. VideoPhone Centrally Controlled User Interface With User Selectable Options, U.S. patent application Ser. No. 09/001,576, filed Dec. 21, 1997;
7. VideoPhone User Interface Having Multiple Menu Hierarchies, U.S. patent application Ser. No. 09,001,908, filed Dec. 31, 1997;
8. VideoPhone Blocker, U.S. patent application Ser. No. 09/001,353, filed Dec. 31, 1997;
9. VideoPhone Inter-com For Extension Phones, U.S. patent application Ser. No. 09/001,358, filed Dec. 31, 1997;
10. Advertising Screen Saver, U.S. patent application Ser. No. 09/001,574 filed Dec. 31, 1997, and issued as U.S. Pat. No. 6,084,583 on Jul. 4, 2000;
11. VideoPhone FlexiView Advertising, U.S. patent application Ser. No. 09/001,574, filed Dec. 31, 1997;
12. VideoPhone Multimedia Announcement Answering Machine, U.S. patent application Ser. No. 09/001,911, filed Dec. 31, 1997;
13. VideoPhone Multimedia Announcement Message Toolkit, U.S. patent application Ser. No. 09/001,345, filed Dec. 31, 1997;
14. VideoPhone Multimedia Video Message Reception, U.S. patent application Ser. No. 09/001,362, filed Dec. 31, 1997;
15. VideoPhone Multimedia Interactive Corporate Menu Answering Machine Announcement, U.S. patent application Ser. No. 09/001,574, filed Dec. 31, 1997;
16. VideoPhone Multimedia Interactive On-Hold Information Menus, U.S. patent application Ser. No. 09/020,916 on Feb. 1, 2000;
17. VideoPhone Advertisement When Calling Video Non-enabled VideoPhone Users, U.S. patent application Ser. No. 09/001,361, filed Dec. 31, 1997;
18. Motion Detection Advertising, U.S. patent application Ser. No. 09/001,355, filed Dec. 31, 1997;
19. Interactive Commercials, U.S. patent application Ser. No. 09/001,578, filed Dec. 31, 1997, and issued as U.S. Pat. No. 6,178,446 on Jan. 23, 1001;
20. VideoPhone Communication Device Providing In-home Catalog Services, U.S. patent application Ser. No. 09/001,421, filed Dec. 31, 1997;
21. A Facilities Management Platform For Hybrid Fiber Twisted-pair Local Loop Network, Service Architecture, U.S. patent application Ser. No. 09/001,422, filed Dec. 31, 1997;
22. Life Line Support for Multiple Service Access on Single Twisted-pair, U.S. patent application Ser. No. 09/001,343, filed Dec. 31, 1997;
23. A Network Server Platform (NSP) For a Hybrid Fiber Twisted-pair (HFTP) Local Loop Network Service Architecture, U.S. patent application Ser. No. 09/001,582, filed Dec. 31, 1997;
24. A Communication Server Apparatus For Interactive Commercial Service, U.S. patent application Ser. No. 09/001,344, filed Dec. 31, 1997;
25. NSP Multicast, PPV Server NSP Based Multicast Digital Program Delivery Services, U.S. patent application Ser. No. 09/001,580, filed Dec. 31, 1997;
26. NSP, Internet, JAVA Server and VideoPhone Application Server, U.S. patent application Ser. No. 09/001,354, filed Dec. 31, 1997, and issued as U.S. Pat. No. 6,044,403 on Mar. 28, 2000;
27. NSP WAN Interconnectivity Services for Corporate Telecommuters Telecommuting, U.S. patent application Ser. No. 09/001,540, filed Dec. 31, 1997;
28. NSP Telephone Directory White-Yellow Page Services, U.S. patent application Ser. No. 09/001,426, filed Dec. 31, 1997, and issued as U.S. Pat. No. 6,052,439 on Apr. 18, 2000;
29. NSP Integrated Billing System For NSP services and Telephone services, U.S. patent application Ser. No. 09/001,359, filed Dec. 31, 1997;
30. Network Server Platform/Facility Management Platform Caching Server, U.S. patent application Ser. No. 09/001,419, filed Dec. 31, 1997;
31. An Integrated Services Director (ISD) for Overall Architecture, U.S. patent application Ser. No. 09/001,417, filed Dec. 31, 1997;
32. ISD and VideoPhone Customer Premise Network, U.S. patent application Ser. No. 09/001,418, filed Dec. 31, 1997;
33. ISD Wireless Network, U.S. patent application Ser. No. 09/001,363, filed Dec. 31, 1997;
34. ISD Controlled Set-Top Box, U.S. patent application Ser. No. 09/001,424, filed Dec. 31, 1997;
35. Integrated Remote Control and Phone, U.S. patent application Ser. No. 09/001,423, filed Dec. 31, 1997;
36. Integrated Remote Control and Phone User Interface, U.S. patent application Ser. No. 09/001,420, filed Dec. 31, 1997;

37. Integrated Remote Control and Phone Form Factor, U.S. patent application Ser. No. 09/001,190, filed Dec. 31, 1997;
38. VideoPhone Mail Machine, U.S. provisional patent application Ser. No. 06/070,014, filed Dec. 31, 1997;
39. Restaurant Ordering Via VideoPhone, U.S. provisional patent application Ser. No. 60/070,121, filed Dec. 31, 1997;
40. Ticket Ordering Via VideoPhone, U.S. provisional patent application Ser. No. 60/070,103, filed Dec. 31, 1997;
41. Multi-Channel Parallel/Serial Concatenated Convolutional Codes And Trellis Coded Modulation Encode/ Decoder, U.S. patent application Ser. No. 09/001,342, filed Dec. 31, 1997;
42. Spread Spectrum Bit Allocation Algorithm, U.S. patent application Ser. No. 09/001,842, filed Dec. 31, 1997;
43. Digital Channelizer With Arbitrary Output Frequency, U.S. patent application Ser. No. 09/001,842, filed Dec. 31, 1997;
44. Method and Apparatus For Allocating Data Via Discrete Multiple Tones, U.S. patent application Ser. No. 08/997,167, filed Dec. 31, 1997, and issued as U.S. Pat. No. 6,134,274 on Oct. 17, 2000;
45. Method And Apparatus For Reducing Near-End Cross Talk In Discrete Multi-Tone Modulators/ Demodulators, U.S. patent application Ser. No. 08/997, 176, filed Dec. 31, 1997.

The parent of the present application is listed above at #42.

What is claimed is:

1. A transmitting modem receiving digital data from a data source, modulating carriers to represent said digital data, and applying a resulting modulated signal to a channel connectable to a receiving modem, said channel being subject to a power spectral density mask, said transmitting modem comprising:

first, second, and third signal modulators, each with an input;

a signal combiner with a combined output connected to said channel;

a serial-to-parallel converter connected to said data source and to each of said first, second, and third signal modulator inputs such that said digital data from said data source is converted to multiple parallel streams applied respectively to said first, second, and third signal modulators;

each of said first, second, and third signal modulators having a respective output connected to said signal combiner such that a sum of output signals of said first, second, and third signal modulators is applied to said channel;

a transfer characteristic of said channel being such that a first minimum power required to represent a specified minimum number of bits by modulating in a first frequency sub-band falls below said power spectral density mask and such a that a second minimum power required to represent a second specified minimum number of bits by modulating in each of second and third frequency sub-bands exceeds said power spectral density mask;

said serial-to-parallel converter being programmed to feed a first bit of said digital data to said first signal modulator to represent said first bit by modulating in said first frequency sub-band at a first power level at least as high as said first minimum power;

said serial-to-parallel converting being programmed to feed a second bit of said digital data to said second and third modulators to represent said second bit by coherently modulating in both said second and said third frequency sub-bands at a second power level below said first power level, whereby resulting signals applied in said second and third frequency sub-bands may be combined by said receiving modem to retrieve said second bit;

said first and second minimum number of bits both being equal to one in the absence of some other specified constraint.

2. A modem as in claim 1, further comprising fourth and fifth modulators, said serial-to-parallel converter being programmed to feed said second bit to said fourth and fifth modulators, whereby said resulting signals applied in said second through fifth frequency sub-bands may be coherently combined by said receiving modem to retrieve said second bit.

3. A modem as in claim 2, wherein said second through fifth frequency sub-bands are substantially adjacent in frequency such that they form a continuous spectrum.

4. A modem as in claim 1, wherein said second and third frequency sub-bands are substantially adjacent in frequency such that they form a continuous spectrum.

5. A modem, comprising:

a frequency-division modulator with a controller, said modulator transmitting input data in frequency channels;

said controller having a memory storing a power spectral density (PSD) mask specifying a respective maximum power level permitted for a signal transmitted in each of said frequency channels;

said controller memory storing an aggregate power limit specifying a total permitted power for all of said signals;

said controller being programmed to measure and store in said memory a measured channel transfer characteristic of a communications channel through which said input data is to be transmitted;

said controller being programmed to transmit respective unique portions of said input data in said each of said frequency channels, responsively to said stored aggregate power limits, said PSD mask, and said measured transfer characteristic being a first transfer characteristic and to transmit a same portion of said data in at least two of said frequency channels responsively to said stored aggregate power limit, said PSD mask, and said measured transfer characteristic being a second transfer characteristic.

6. A modem as recited in claim 5, said frequency division modulator and controller for transmitting data from a data source over a channel comprising:

a signal modulator with an input and first, second, and third outputs, each transmitting data in a respective one of a first, second, and third frequency bands;

a channel response detector connected to said channel to detect a transfer characteristic of said channel, said transfer characteristic including a noise power level and an attenuation of said channel;

a controller connected to said signal modulator to control an allocation of first and second blocks of data from said data source for transmission in said first, second, and third frequency bands;

said controller being programmed to transmit said first block of data in said first frequency band and transmit said second block redundantly in each of said second and third frequency bands at a first power level when said channel transfer characteristic is such that a power level required to transmit said second block, at a specified bit error rate, in said second frequency band alone in a first power level and to transmit said second block in said second frequency band alone when said channel transfer characteristic is such that a power level required to transmit said second block, at said specified bit error rate, in said second frequency band alone at a second power level, said second power level being higher than said first power level.

7. A modem as in claim 6, wherein said controller transmits said second block redundantly in said second and third frequency bands when an amount of power required to transmit a single bit in said second frequency band exceeds a power spectral density mask limit stored by said controller.

8. A modem as in claim 7, wherein said controller is programmed to transmit said second data block in said second frequency band alone when a power required to transmit said second data block in said second frequency band is less than a power spectral density mask limit stored by said controller and greater than an aggregate power limit for all said first, second, and third frequency bands stored by said controller.

9. A modem as in claim 6, wherein said controller is programmed to calculate an array of values each indicating an amount of power required to transmit a minimum number of bits in each of said second and third frequency bands and to sort said array according to said power, said controller being further programmed to transmit said second block in said second and third frequency bands responsively to one of said second and said third frequency bands appearing in said sorted array at a position indicating that said second bin requires a minimum amount of power to transmit said minimum number of bits.

10. A modem as in claim 6, wherein said controller is programmed to calculate an array of values each indicating an amount of power required to transmit a minimum number of bits in each of said second and third frequency bands and to sort said array according to said power, said controller being further programmed to transmit said second block in said second and third frequency bands responsively to said sorted array.

11. A modem as in claim 5, wherein said respective transfer characteristic is responsive to a specified error rate.

12. A modem as in claim 5, wherein said first transfer characteristic is characterized by at least one of a lower aggregate noise level and a lower aggregate attenuation than said second transfer characteristic.

13. A method for increasing a data rate in a communication channel subject to a power spectral density mask, comprising:

detecting a transfer characteristic indicating a required minimum power of a respective carrier modulated to transmit one bit in each of a plurality of multitone subchannels of said channel;

supplying a data stream to a modulator;

modulating a first set of respective carriers to represent respective unique portions of said data stream in at least a subset of those of said multitone subchannels for which, in said step of detecting indicates said minimum power falls below a power limit imposed by said power spectral density mask;

modulating a second set of respective carriers to represent redundantly at least one portion of said data stream in at least a subset of those of said multitone subchannels for which said step of detecting indicates said minimum power exceeds a power limit imposed by said power spectral density mask;

receiving said at least first and second symbols at a receiving end of said communication channel;

combining said at least first and second symbols received at said receiving end in such a way as to increase a signal power of said at least first and second symbols and, on average, reduce incoherent distortion of said at least first and second symbols;

reconstructing said same portion of said data stream at said receiving end from a combination of said at least first and second symbols, resulting from said step of combining.

* * * * *

UNITED STATES PATENT AND TRADEMARK OFFICE
CERTIFICATE OF CORRECTION

PATENT NO. : 6,285,708 B1  
DATED : September 4, 2001  
INVENTOR(S) : Richard R. Shively et al.

Page 1 of 1

It is certified that error appears in the above-identified patent and that said Letters Patent is hereby corrected as shown below:

<u>Column 21,</u>  
Line 33, the word "bin" has been deleted and the word -- band -- has been inserted therefor.

Signed and Sealed this

Twenty-first Day of May, 2002

Attest:

Attesting Officer

JAMES E. ROGAN  
*Director of the United States Patent and Trademark Office*